(12) United States Patent
Moritz et al.

(10) Patent No.: US 8,620,764 B2
(45) Date of Patent: Dec. 31, 2013

(54) METHOD FOR PROVIDING A RECOMMENDATION SUCH AS A PERSONALIZED RECOMMENDATION, RECOMMENDER SYSTEM, AND COMPUTER PROGRAM PRODUCT COMPRISING A RECOMMENDER COMPUTER PROGRAM

(75) Inventors: Simon Moritz, Stockholm (SE); Abhiroop Gupta, Sundbyberg (SE); Tony Larsson, Upplands Vasby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 47 days.

(21) Appl. No.: 13/351,639

(22) Filed: Jan. 17, 2012

(65) Prior Publication Data

US 2012/0290434 A1    Nov. 15, 2012

Related U.S. Application Data

(60) Provisional application No. 61/483,901, filed on May 9, 2011.

(51) Int. Cl.
*G06Q 30/00* (2012.01)

(52) U.S. Cl.
USPC .......................................................... 705/26.1

(58) Field of Classification Search
USPC .......................................................... 705/26.1
See application file for complete search history.

(56) References Cited

U.S. PATENT DOCUMENTS

| 2004/0043758 A1* | 3/2004 | Sorvari et al. ............... 455/414.1 |
| 2010/0070871 A1* | 3/2010 | Liesche et al. ............... 715/744 |
| 2010/0076968 A1* | 3/2010 | Boyns et al. ............... 707/732 |
| 2012/0021770 A1* | 1/2012 | Naqvi ............... 455/456.3 |

* cited by examiner

*Primary Examiner* — Mila Airapetian
(74) *Attorney, Agent, or Firm* — Rothwell, Figg, Ernst & Manbeck, P.C.

(57) ABSTRACT

A recommendation engine of a recommender system provides a mobile device user with a personalized recommendation based on, at least in part, the user's current situation. In some embodiments, the recommender system determines the user's current situation by obtaining information identifying the user's present context(s) (e.g., location context, noise context, time context, etc.). For example, assume the user presently has the location context of "at home" and the noise context of "TV on." From these contexts, the recommender system can categorize the user as being in the "at home relaxing" situation.

24 Claims, 15 Drawing Sheets

| userId | itemId | rating | situationId | situationProbability |
|---|---|---|---|---|
| 1 | 1 | 4 | 1 | 0.8 |
| 1 | 2 | 3 | 2 | 0.7 |
| 2 | 1 | 4 | 2 | 0.85 |
| 3 | 1 | 3 | 1 | 0.9 |
| 3 | 2 | 3 | 3 | 0.65 |
| 3 | 3 | 5 | 1 | 0.2 |
| 4 | 1 | 3 | 2 | 0.7 |
| 4 | 3 | 2 | 3 | 0.5 |

FIG. 14

METHOD FOR PROVIDING A RECOMMENDATION SUCH AS A PERSONALIZED RECOMMENDATION, RECOMMENDER SYSTEM, AND COMPUTER PROGRAM PRODUCT COMPRISING A RECOMMENDER COMPUTER PROGRAM

This application claims the benefit of U.S. Provisional Patent Application No. 61/483,901, filed on May 9, 2011, the entire contents of which is incorporated by reference herein.

TECHNICAL FIELD

The disclosure herein relates to the field of recommender systems.

BACKGROUND

Recommender systems are a common component of an e-commerce system. A recommender system functions to select items, such as, for example, consumer products (e.g., books, personal computers, or other consumer goods), entertainment content (e.g., music, movies, TV programs), news stories, web pages, publications, services, and applications, to recommend to a user. Recommender systems may use filtering techniques that attempt to enable the recommender system to select items that are likely to be of interest to the user. Typically, a recommender system that provides personalized recommendations compares a user's profile to some reference characteristics, and seeks to predict a rating that the user would give to an item the user has not yet rated (implicitly or explicitly). These characteristics may be from the information item (the content-based approach) or the user's social environment (the collaborative filtering approach).

While recommender systems that function to provide personalized recommendations are prevalent today, there is, nonetheless, a desire for improving such recommender systems.

SUMMARY

In a typical e-commerce system having a recommender system, the recommender system provides to a user a recommendation identifying items that may be of interest to the user. For example, when a user goes to an e-commerce site (e.g., Amazon.com) that maintains a purchase history for the user (e.g., information identifying the items the user previously purchased through the site), the recommender system for the site may select items to recommend to the user based on the user's purchase history. That is, the recommender system may recommend to the user items that are similar to an item the user previously purchased. It is also typical for the recommendation system to provide to the user a recommendation identifying items that other users who are "similar" to the user have rated favorably (either implicitly or explicitly). A classic example is Amazon's "customers who bought or viewed book X also bought or viewed book Y" feature.

While a user may be interested in receiving a recommendation for items similar to some random item the user purchased in the past, the user may be more interested in receiving a recommendation for items similar to a particular item the user purchased when the user was in a situation identical to (or similar to) the user's present situation. For example, if the user is presently in a "working" situation (e.g., the user is located at the user's office during normal business hours), the user may prefer to receive a recommendation that identifies primarily (or only) items similar to an item the user had purchased when the user was in the "working" situation, as opposed to the "at home relaxing" situation (e.g., the situation in which the user is at home watching TV and the current time is between 8 PM and 10 PM, local time for the user). As used herein, the term "situation" encompasses a set of one or more contexts (e.g., a set of one or more pre-defined contexts, each of which may have been derived from sensor data or other data).

Similarly, while a user may be interested in receiving a recommendation for items rated favorably by other users who are similar to the user (e.g., other users who purchased the book the user is currently contemplating purchasing), the user may be more interested in receiving a recommendation that identifies items that were rated favorably by the other users when those other users were in a situation identical to (or similar to) the user's present situation. For example, if the user is presently in the "working" situation, the user may prefer to receive a recommendation that identifies primarily (or only) items that were rated favorably by other users, who are similar to the user, when those other similar users were in the "working" situation.

Accordingly, in some embodiments, a recommendation engine of a recommender system provides a mobile device user with a personalized recommendation based on, at least in part, the user's present situation. In some embodiments, the recommender system determines the user's present situation by obtaining information identifying the user's present context(s) (e.g., location context, activity context, time context, etc.). For example, assume the user presently has the location context of "at home" and the noise context of "TV on." From these contexts, the recommender system can categorize the user as being in the "at home relaxing" situation.

The user's contexts may be determined by one or more sensor readings. For example, the recommender system can determine the user's location context from location information, such as, for example, location information made available by, for example, a Global Positioning System (GPS) module (e.g., mobile phone with GPS receiver) that the user currently has in his possession, or any other location information made available by any other technique. As another example, the recommender system may determine the user's activity context using audio information obtained from a microphone built into the mobile phone the user has in his possession. For example, if the microphone picks up an audio watermark embedded into the audio of a TV show, then it would be reasonable for the recommender system to deduce that the user is watching the TV show. As another example, if the microphone picks up several people talking at once and the user's GPS device provides location information indicating that the user is located at someone's residence and time information indicating that user's local time is between 6 PM and 8 PM, then it would be reasonable for the recommender system to deduce that the user's situation is that the user is attending a cocktail or dinner party at someone's home.

The predicted situation is provided as an input to a recommendation engine, which may select items to recommend to the user based on, for example, ratings made by similar users at a time when the similar user where in a situation similar (or identical) to the user's present situation.

In one aspect, a method for providing to a first user a recommendation is provided. In some embodiments, the method is performed by a computer (i.e., a set of one or more programmable devices, such as, for example, a personal computer (PC), server computer, smartphone, or other programmable device) of a recommender system. In some embodiments the method begins with obtaining first sensor data from a first sensor of a communication device the first user is presently using or, at the least, has in his/her possession and obtaining second sensor data from a second sensor of the communication device. The method may further include using the first sensor data and a first pre-defined set of contexts to select a first context from the first pre-defined set of contexts and using the second sensor data and a second pre-defined set of contexts to select a second context from the second pre-defined set of contexts. The first pre-defined set of contexts may be identical with the second pre-defined set of contexts. The method may further include deducing a situation using the selected contexts and selecting a set of one or more items to recommend to the first user based on, at least in part, the deduced situation.

In some embodiments, the step of selecting a set of one or more items includes: determining at least one user that is similar to said first user; determining a set of one or more apps that were consumed by said similar user in a situation similar to the deduced situation; and selecting one or more apps from said set of one or more apps to recommend to the first user.

In some embodiments, the step of selecting a set of one or more items includes selecting a particular application (app) to recommend to the first user in response to determining that at least a threshold number of other users consumed the particular app in a situation similar to the deduced situation.

In some embodiments, the method also includes: determining at least one user that is similar to said first user; determining a set of one or more apps that were consumed by said similar user; and selecting one or more apps from said set of one or more apps to recommend to the first user.

In some embodiments, the first sensor data includes location information identifying the first user's location. In such embodiments, the method may also include determining a set of one or more apps that were consumed by at least one other user at a location within a predefined distance of the user's location and selecting one or more apps from said determined set of one or more apps to recommend to the first user. In such embodiments, the method may also include using the location information to obtain from a geographic information service tags associated with the first user's location; determining an app associated with one or more of the tags; and selecting the determined app to recommend to the first user. In such embodiments, the step of selecting the first context may include determining whether the first user is located within his/her home or at his/her workplace and selecting a "home" context in response to a determination that the first user is located within the home or selecting a "work" context in response to a determination that the first user is located at the workplace.

In another aspect, there is provided an apparatus for use in a recommendation system for providing to a first user a recommendation. In some embodiments, the apparatus includes a data collection unit adapted to obtain first sensor data from a first sensor and second sensor data from a second sensor. The apparatus may further include a context inference unit adapted to: (a) use the first sensor data and a first pre-defined set of contexts to select a first context from the first pre-defined set of contexts and (b) use the second sensor data and a second pre-defined set of contexts to select a second context from the second pre-defined set of contexts. The apparatus may also include a situational reasoning unit adapted to deduce a situation using the selected contexts and a recommendation engine adapted to select a set of one or more items to recommend to the first user based on, at least in part, the deduced situation.

In another aspect there is provided a computer program product comprising computer readable program code that implements a computer program and that is stored on a computer readable medium. In some embodiments, the computer readable program code is configured such that when executed by a processor, the computer readable program code causes the processor to perform a method. In some embodiments, the method may include obtaining first sensor data from a first sensor of a communication device the first user is presently using or, at the least, has in his/her possession and obtaining second sensor data from a second sensor of the communication device. The method may also include using the first sensor data and a first pre-defined set of contexts to select a first context from the first pre-defined set of contexts and using the second sensor data and a second pre-defined set of contexts to select a second context from the second pre-defined set of contexts. The method may also include deducing a situation using the selected contexts and selecting a set of one or more items to recommend to the first user based on, at least in part, the deduced situation.

Modifications and other embodiments of the disclosed recommendation system will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments and, together with the description, further serve to enable a person skilled in the pertinent art to make and use, for example, a recommender system disclosed herein as well as a method for recommendation, a recommender computer program and a computer program product (e.g., a computer-readable medium) that comprises the recommender computer program. In the drawings, like reference numbers indicate identical or functionally similar elements.

FIG. 14 illustrates an example database table according to some embodiments.

DETAILED DESCRIPTION

Figure 1:
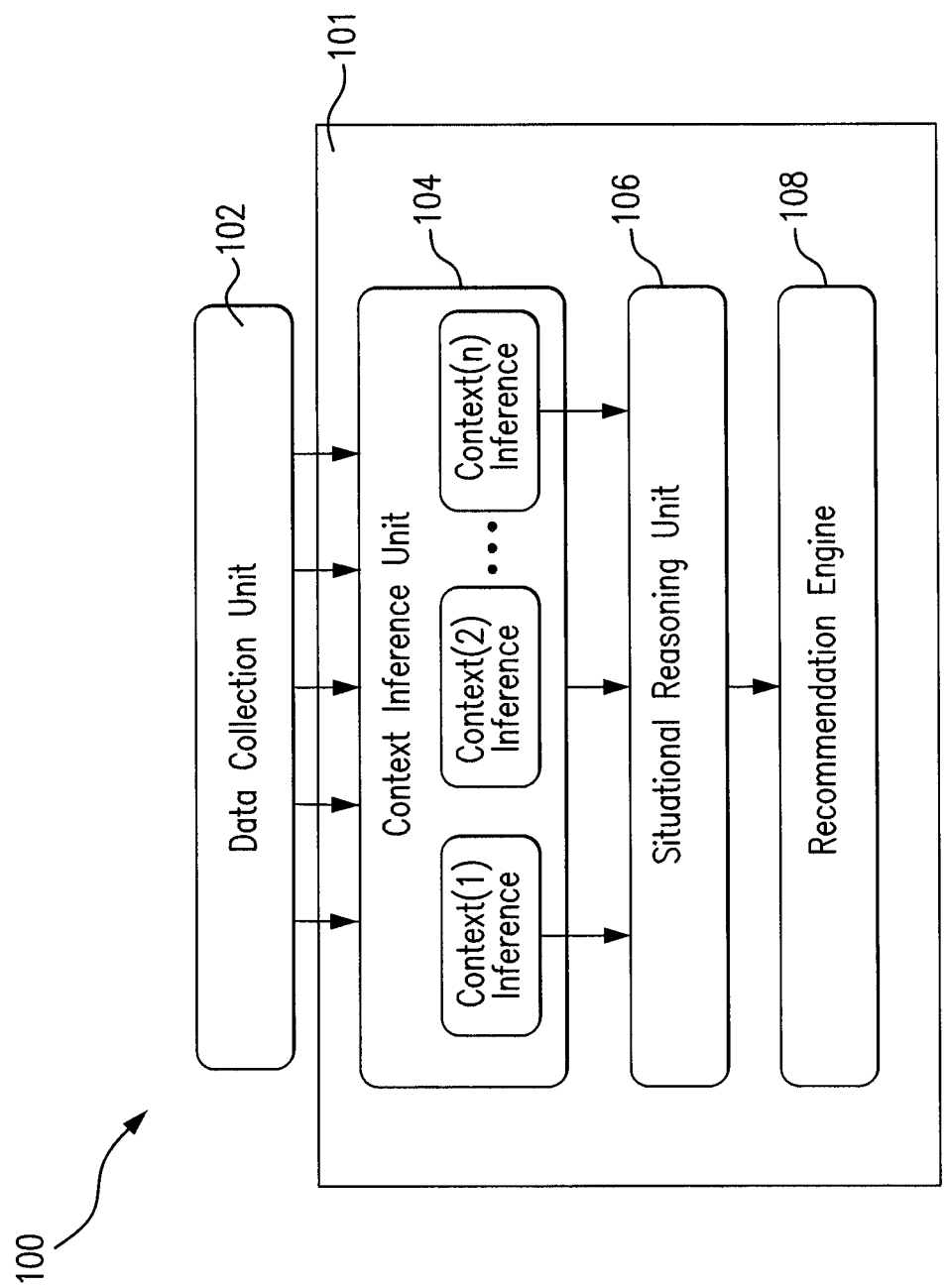
FIG. 1 illustrates an exemplary recommender system.

FIG. 1 illustrates a system 100, according to some embodiments, for providing to a user recommendations (e.g., personalized recommendations). In the embodiment shown, system 100 includes a recommender system 101 and a data collection unit 102. Recommender system 101 may include, as shown, a context inference unit 104 for deducing the user's contexts based on data received from data collection unit 102, a situational reasoning unit 106 for deducing the user's situation based on the context or contexts deduced by context inference unit 104, and a recommendation engine 108 capable of selecting items to recommend to the user based on, at least in part, the user's present situation as deduced by situational reasoning unit 106.

Figure 2:
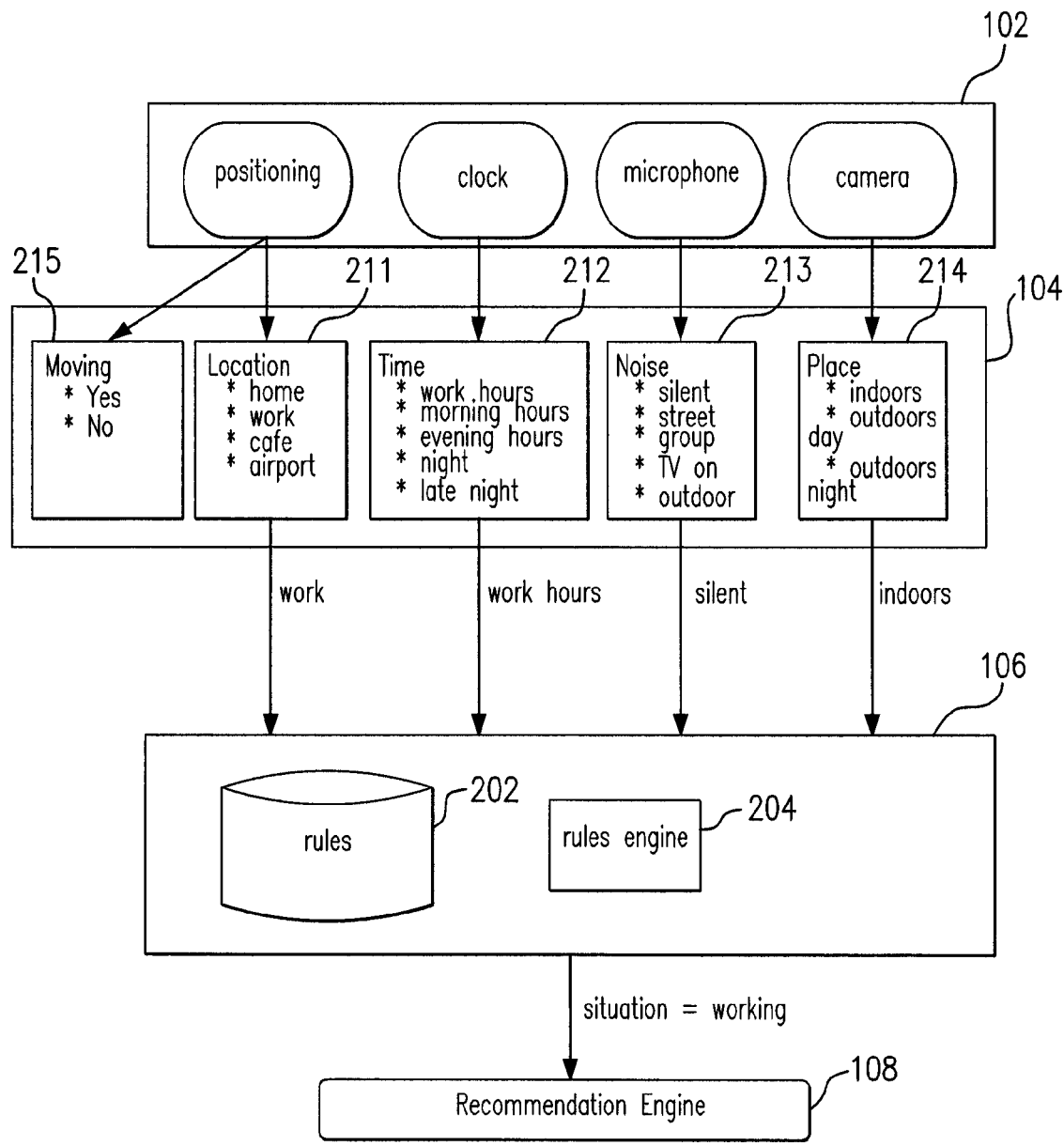
FIG. 2 further illustrates various components of the example recommender system.

FIG. 2 further illustrates data collection unit 102, context inference unit 104, and situational reasoning unit 106, according to some embodiments. In the embodiment shown in FIG. 2, data collection unit 102 may include a number of data producing elements ("sensors"). More specifically, in the embodiments shown, data collection unit may include the following sensors: a positioning system module (e.g., a receiver for receiving and processing GPS signals or signals from any other positioning systems, such as GALILEO, GLONAS and BeiDou) that can output location information (e.g., longitude and latitude data), a clock for outputting time and date data, a microphone for outputting audio data, and a camera for outputting image data. Yet other input parameters that could be used for e.g. location estimation instead of or in addition thereto are information from: (a) social network applications, e.g. "checked-in" information from Facebook and Foursquare, (b) position information from a telecommunications network using any triangulation method or cell-ID method known in the art of positioning a user equipment attached to a mobile telecommunications network, positioning systems utilizing odometry/dead reckoning technology, and information about a current IP-address of a user device. In some embodiments, data collection unit 102 may include other data producing elements, such as, for example, accelerometers, altitude meters, temperature sensors, and speed sensors.

In the embodiment shown in FIG. 2, context inference unit 104 may consist of independent context inference components (e.g., location 211, time 212, noise 213, place 214, and moving 215 context inference components). Each context inference component receives data from one or more of the data producing elements (data received from a data producing element is referred to herein as "sensor data"), and determines a context based on the received sensor data. The output of each context inference component may be Boolean or fuzzy depending on the type of the variable. Scalability of the system can be maximized by this architecture because functionally can expand by simply adding new data producing elements and new context inference components.

In the example shown in FIG. 2, each context inference component selects one or more context values from a predefined set of context values based on the sensor data the context inference component receives from its corresponding data producing element. For example, the location context inference component selects a location context value from a predefined set of location context values based on sensor data (e.g., location information) that the location context inference component receives from the positioning module. As shown in FIG. 2, the predefined set of location context values may include or consist of the following values: "home," "work," "café," and "airport." But this is just an example. Similarly, as shown in FIG. 2, the predefined set of time context values may include or consist of the following values: "work hours," "morning hours," "evening hours," "night," "late night." In addition to selecting context values based on sensor data received from data collection unit 102, context inference unit 104 may assign a probability value to each selected context value representing a confidence level of the value.

As further shown in FIG. 2, after context inference unit 104 selects context values based on sensor data received from data collection unit 102, context inference unit 104 provides the selected context values (and probability values, if present) to situational reasoning unit 106. In the example shown in FIG. 2, context inference unit 104 provides the following context values to situational reasoning unit 106: location context="work"; time context="work hours"; noise context="silent", and place context="indoors." Situational reasoning unit 106 is configured to determine a situation value representing the user's situation based on the set of context values and associated probability values, if any, received from context inference unit 104. In some embodiments, as shown in FIG. 2, situational reasoning unit 106 may deduce the user's situation using a rules database 202 that may, for each of a plurality of sets of context values, map the set of context value to situation value. A rules engine 204 uses the received set context values to find the matching set of context values in the rules database. The situation value that is mapped to the matching set of rules identifies the user's situation. In some embodiments, a probabilistic reasoning mechanism can by implemented by situational reasoning unit 106 to aid in the determination of the appropriate situation value.

After determining the situation value that identifies the user's situation, situational reasoning unit 106 provides the situation value to recommendation engine 108. Recommendation engine 108 uses the situation value generated by situational reasoning unit 106 as an input to filter recommendations for the user. The implementation of recommendation engine 108 can be done using the different recommendation techniques described above (e.g., collaborative filtering and/or content based approaches). For example, in response to a trigger (e.g., a request from the user for information) recommendation engine 108 may (1) use purchase history data for the user and the received situation value to select an item the user had previously purchased at a time when the user was in a situation at least similar (or identical) to the situation identified by the situation value, (2) determine items that are similar to the selected item, and (3) provide to the user information about the determined similar items.

As another example, in response to a trigger (e.g., a request from the user for information about a particular item) recommendation engine 108 may (1) use purchase history data pertaining to other users and the received situation value to select a set of items other users purchased at a time when the other users were in a situation at least similar (or identical) to the situation identified by the situation value and (2) provide to the user information about the selected set of items. As yet another example, in response to receiving the situation value, recommendation engine 108 may automatically modify a menu of items (e.g., may modify the set of applications that are displayed on a "desktop") based on the situation value. As a specific example, if the user's situation is "working," then an application menu may be modified to contain only (or primarily) applications related to work functions.

Figure 3:
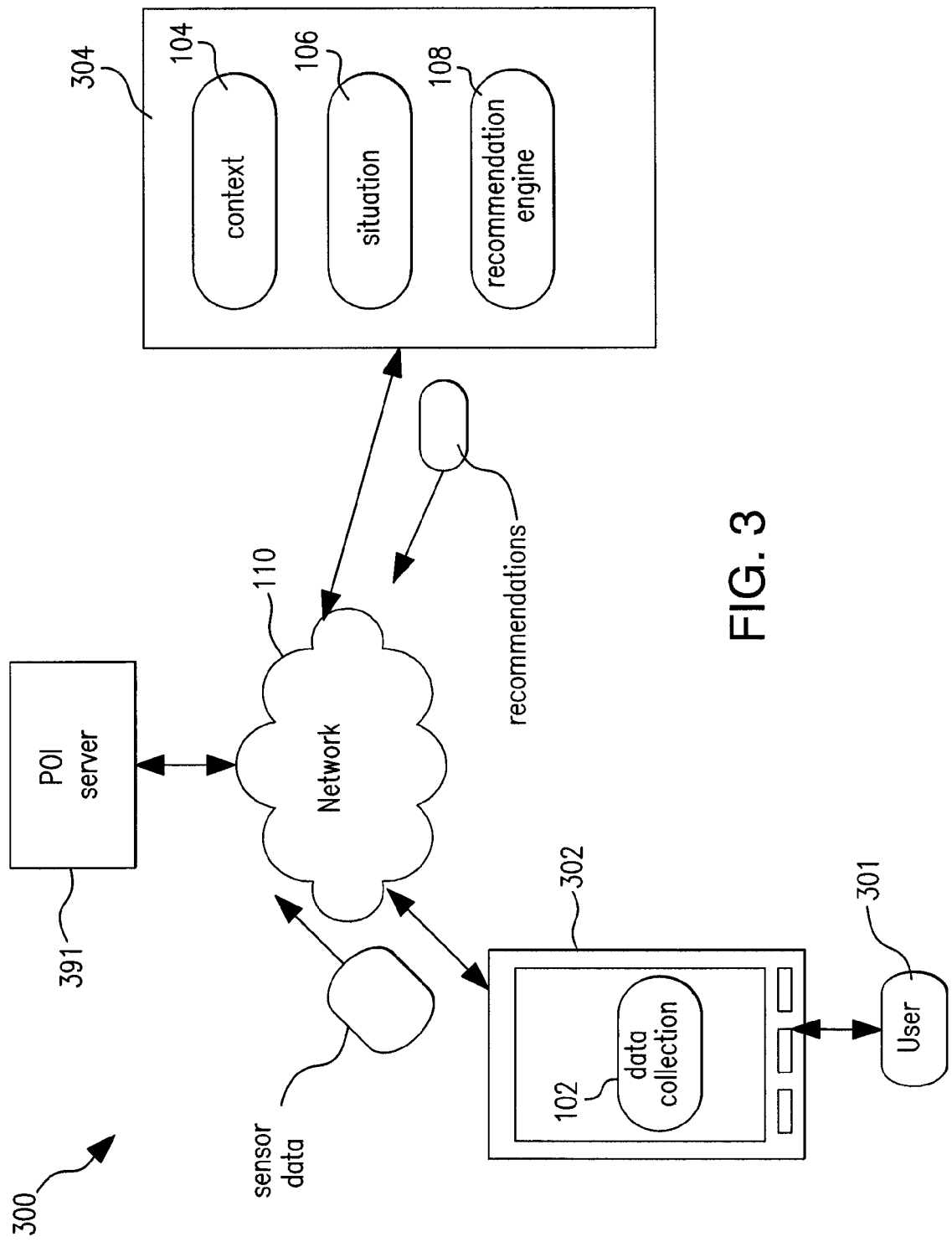
FIG. 3 illustrates a system in which a recommender system may be implemented.

Referring now to FIG. 3, FIG. 3 illustrates a system 300 in which system 100 may be implemented. As illustrated in FIG. 3, it is contemplated that system 100 may be a distributed system, meaning that one or more components of system 100 may reside on a first device (e.g., a mobile communication device 302) and one or more components may reside on a second device (e.g., server 304) that is not co-located with the first device. As an example, in the embodiment shown, data collection unit 102 is implemented with mobile communication device 302, whereas the recommender system 101 is implemented in a remote server 304. In other embodiments, components of recommender system 101 and data collection unit 102 may be implemented on the same device. A network 110 may connect device 302 with server 304 so that the two devices may communicate with each other via the network 110. As shown in FIG. 3, device 302 may communicate sensor data (e.g., data output by the positioning module, data output by the microphone) to server 304, and server 304 communicates recommendations to device 302 based on, at least in part, a situation value determined from context values determined from the sensor data.

Figure 9:
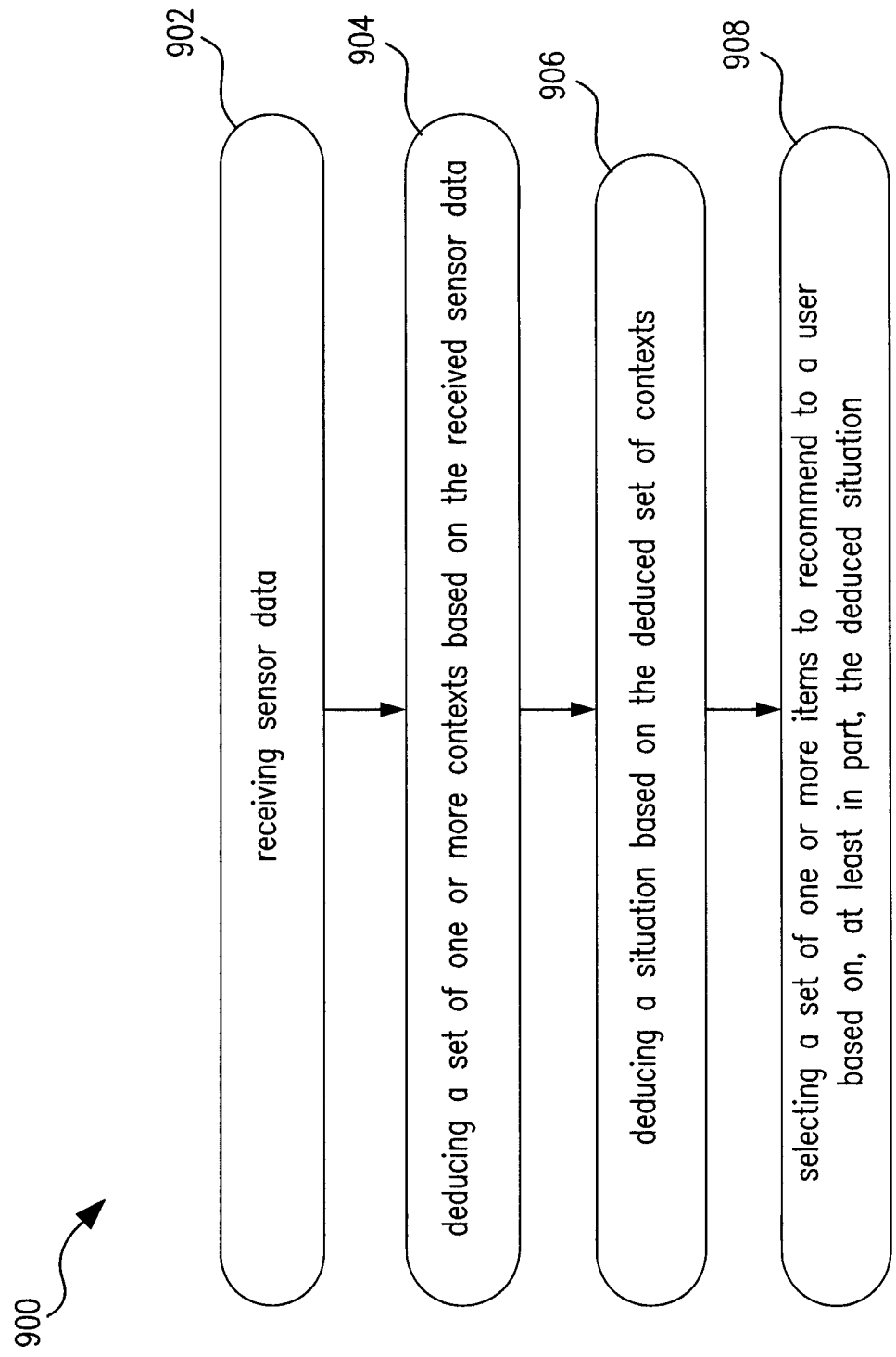
FIG. 9 is a flow chart illustrating a process according to an embodiment.

FIG. 9 illustrates a process 900 that may be performed by recommender system 101. Process 900 may begin in step 902 where recommender system 101 receives sensor data. For example, in step 902, recommender system 101 may receive from communication device 302 a request for a recommendation, wherein the request includes sensor data output by elements of data collection unit 102. The request may also include a user identifier that identifies user 301. In step 904, context inference unit 104 of recommender system 101 deduces contexts based on the received sensor data. For example, in step 904 context inference unit 104 may, for each of a plurality of pre-defined contexts, select a context value based on at least some of the received sensor data. This set of context values are provided to situational reasoning unit 106. In step 906, situational reasoning unit 106 deduces the user's present situation using the set of context values and provides to recommendation engine 108 a situation value identifying the deduced situation. In step 908, recommendation engine 108 selects a set of one or more items to recommend to the user based on, at least in part, the situation value. In this manner, recommender system 101 is operable to provide to the user a personalized recommendation based on the user's present situation.

Figure 4:
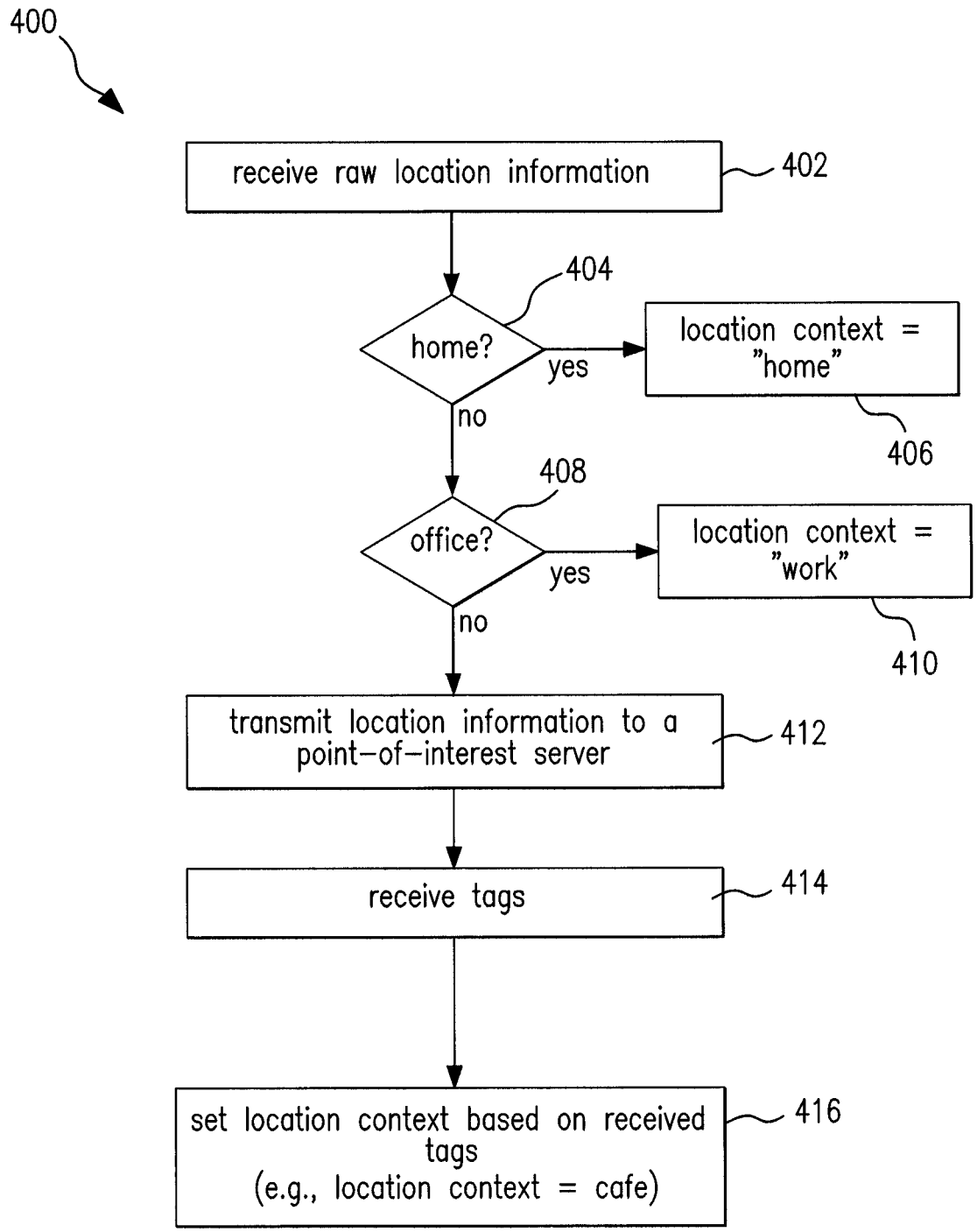
FIG. 4 is a flow chart illustrating a process according to an embodiment.

FIG. 4 illustrates a process 400 that may be performed by location context inference component 211. Process 400 may begin in step 402, where component 211 receives location information from data collection unit 102. For example, as described above, component 211 may receive latitude and longitude data from a positioning module (e.g., GPS unit) of data collection unit 102. If the data collection unit 102 is implemented in a mobile phone that does not have GPS or the like capabilities, then component 211 may receive other location information, such as one or more cell identifiers, which may be used to determine at least a rough estimate of the mobile phone's location. It should also be mentioned that the location information in addition thereto may comprise an altitude parameter which could be retrieved from the GPS unit or some other unit from which the height above sea level or a level in a building can be sensed. Example of the former is unit using an air pressure sensor/altitude meter, and examples of the latter are Wireless network units which senses wireless network IDs and RFD (Radio Frequency Identification) tag-reading circuits. In for example a building where there is a restaurant on the first floor and an office on the 20th floor, the location information can be used for deducing different situations in dependence of the whether the sensed location belongs to the first floor or the 20th floor.

In step 404, component 211 uses the received location information to determine whether user 301 is at home. For example, component 211 may have access to a profile belonging to user 301 that stores location information identifying user 301's home location, and may compare the location information received in step 402 to the information from user 301's profile that identifies user 301's home location to see if there is a match. If the received location information matches the home location information in user 301's profile, then component 211 sets the location context for user 301 equal to the value "home", as indicated in step 406.

In step 408, component 211 uses the received location information to determine whether user 301 is at work. For example, in step 408, if user 301's profile includes location information identifying user 301's office location, then component 211 may compare the location information received in step 402 to the information from user 301's profile that identifies user 301's office location to see if there is a match. If the received location information matches the office location information in user 301's profile, then component 211 sets the location context for user 301 equal to the value "work", as indicated in step 410.

In step 412, which is reached if the user is not at home and not at work, component 211 transmits the received location information to a point-of-interest server 391. In step 414, component 211 receives from point-of-interest server 391 a response, which may include tags (e.g., information describing the user's location—such as information describing the type of establishment in which the user is located). For example, if user 301 is in a café, then the response from point-of-interest server 391 may include information identifying that the location of user 301 matches the location of a café. In step 416, component 211 sets the location context for user 301 based on the response from point-of-interest server 391.

Figure 5:
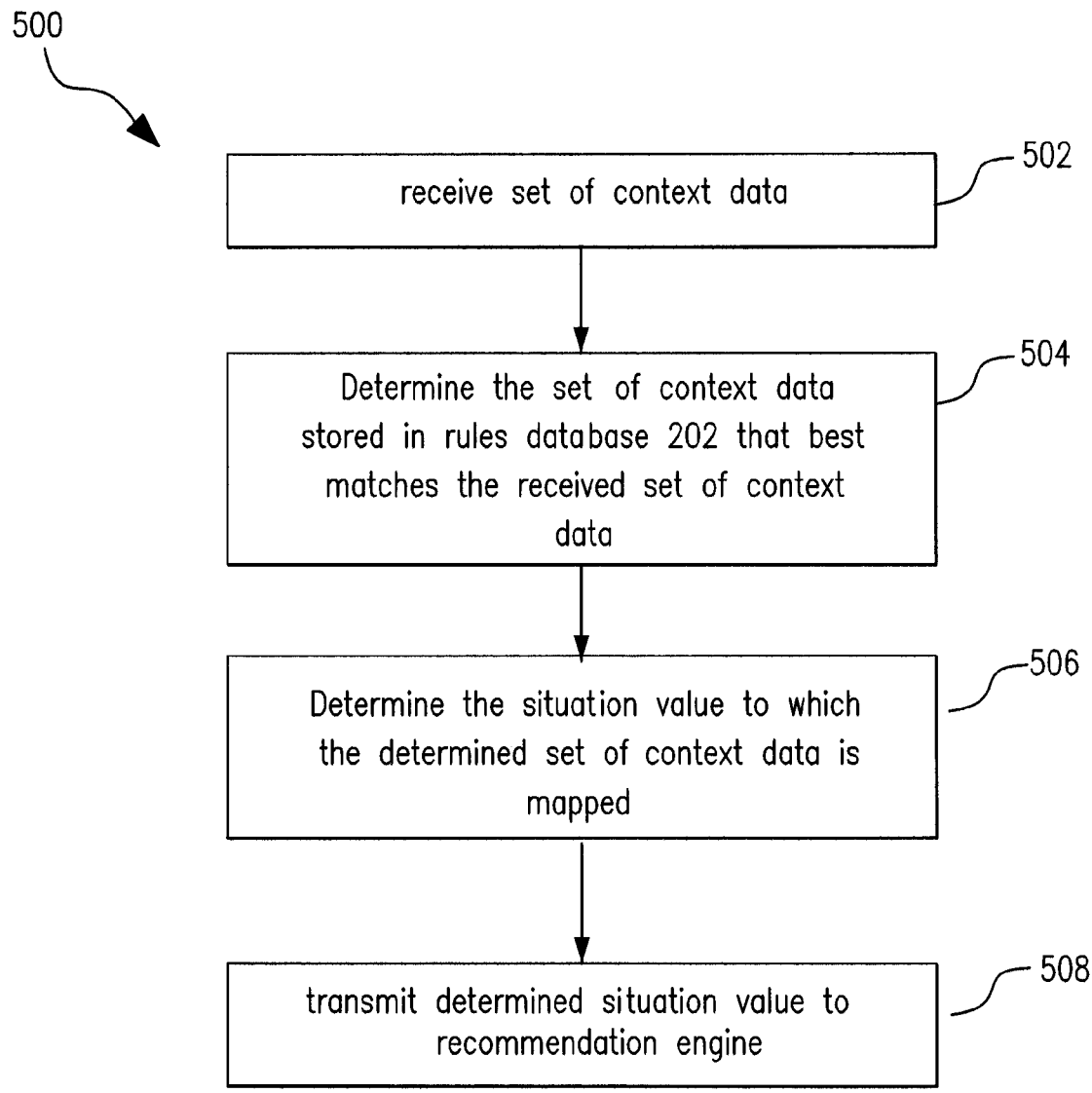
FIG. 5 is a flow chart illustrating a process according to an embodiment.

FIG. 5 illustrates a process 500 that may be performed by situational reasoning unit 106. Process 500 may begin in step 502, where situational reasoning unit 106 receives a set of context values from context inference unit 104. In step 504, situational reasoning unit 106 compares the received set of context values to different sets of context values stored in rules database 202 to determine the set of context values stored in rules database 202 that best matches the set of context values received in step 502. In step 506, situational reasoning unit 106 determines the situation value to which the best matching set of context values determined in step 504 is mapped. In step 508, situational reasoning unit 106 provides the determined situation value recommendation engine 108, which will then use the situation value in formulating a set of items to recommend to user 301.

Figure 6:
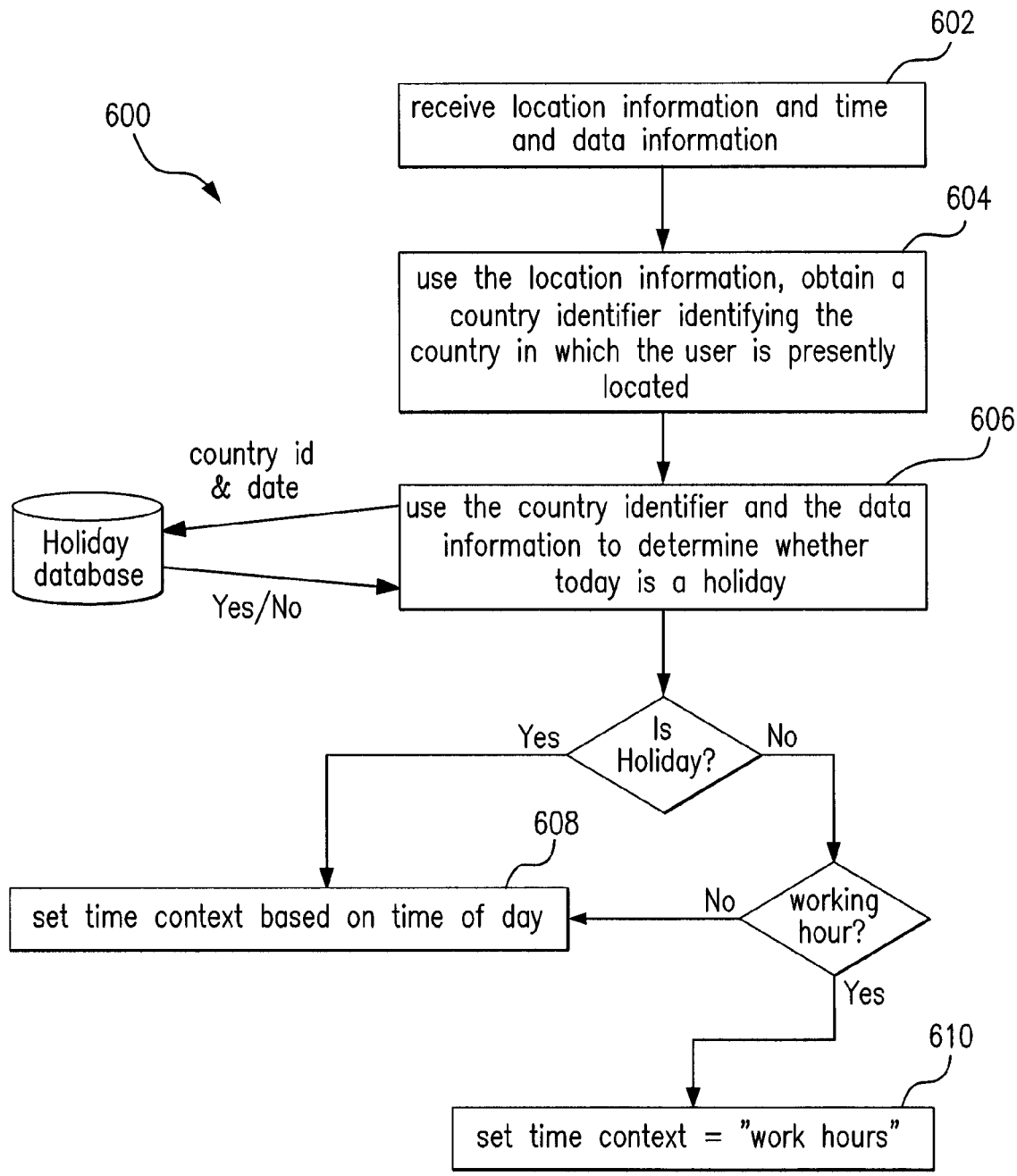
FIG. 6 is a flow chart illustrating a process according to an embodiment.

FIG. 6 illustrates a process 600 that may be performed by time context inference component 212. Process 600 may begin in step 602, where time context inference component 212 receives sensor data from data collection unit 102 (e.g., location information and time and date information identifying user 301's present local time and the present date, respectively). In step 604, time context inference component 212 uses the received location information to obtain an identifier identifying the country in which user 301 is located. In step 606, time context inference component 212 uses the country identifier and the date information to determine whether the present date is a non-work day (e.g., holiday). If it is a holiday, then time context inference component 212 sets user 301's time context to something other than "work hours" (e.g., depending on the time information, the time context may be set to "late night") (step 608). In step 610, time context inference component 212 uses the received time information to determine whether the present time falls within a certain window of time (e.g., traditional work hours of 9 AM to 6 PM). If the current time falls within this window, then time context inference component 212 sets the time context to "work hours" as indicated in step 610, otherwise time context inference component 212 performs step 608.

Figure 10:
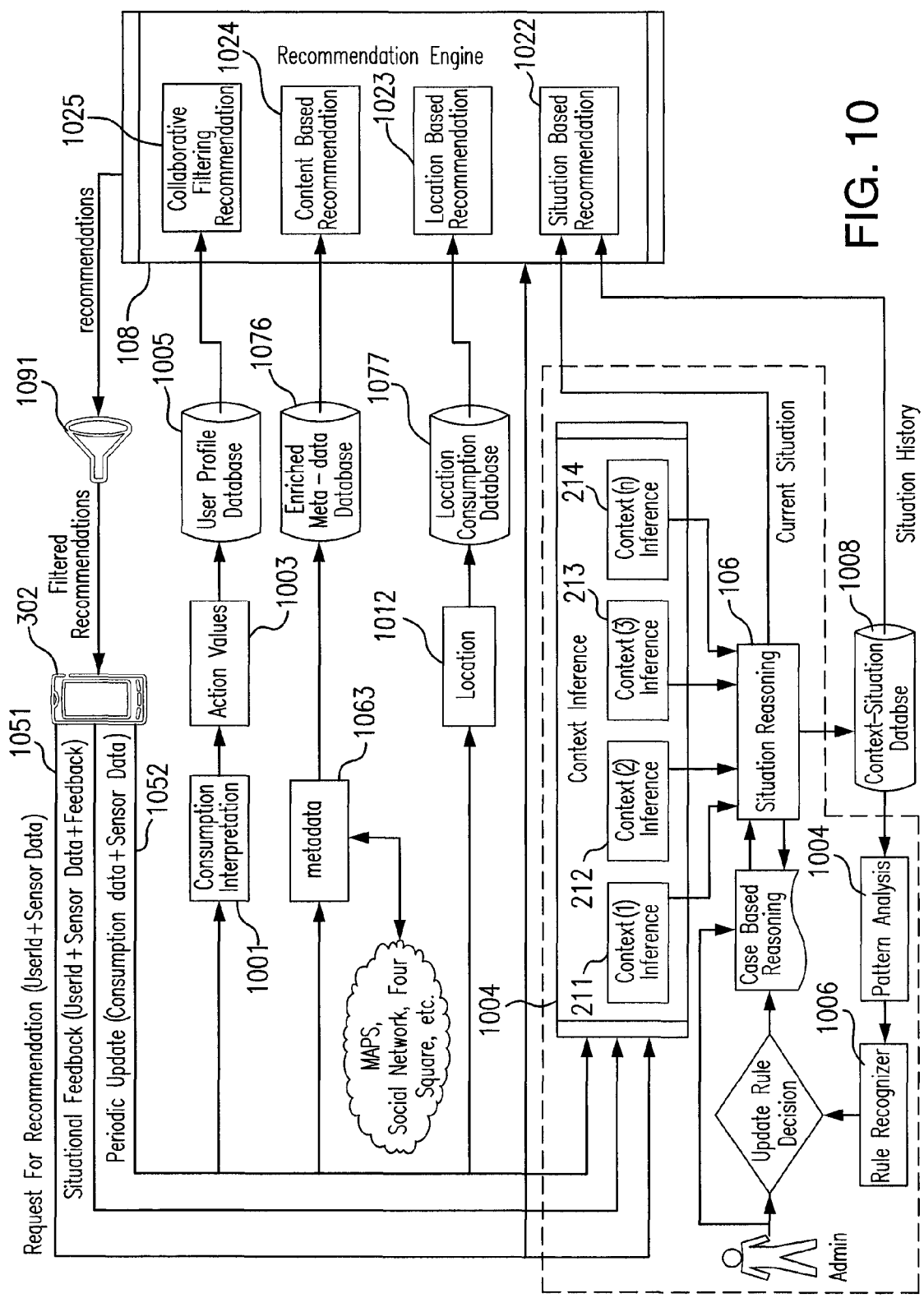
FIG. 10 illustrates a recommendation process flow diagram.

FIG. 10 is a recommendation process flow diagram according to some embodiments of the recommender system 101. As shown in FIG. 10, device 302 may transmit a request 1051 for a recommendation, which request may include a user identifier ("udserId") of the user using device 302 and sensor data produced by device 302. This request may be received and processed by context inference unit 104 and recommendation engine 108.

As described above, context inference unit 104 may select context values based on sensor data received from device 302 and provide the selected context values (and probability values, if present) to situational reasoning unit 106, which uses the context values to deduce the user's/device 302 current situation.

When recommendation engine 108 receives request 1051, one or more of its recommender modules may select one or more items to recommend to the user. For example, situation based recommendation module 1022 may obtain from situational reasoning unit 106 information identifying the user's current situation and then select one or more items to recommend to the user based on the consumptions of other users (e.g., any other user or only other user's who are similar to the user) in situations similar to the user's current situation.

Additionally, location based recommendation module 1023 may select one or more items to recommend to the user based on the user's location (information identifying the user's location may be included in request 1051). For example, location based recommendation module 1023 may select items that were recently consumed (e.g., consumed within the last day, week, month) at a location within a certain distance (e.g., 10 feet, 50 feet, 100 feet, 500 feet) of the user's current location. Module 1023 may obtain this historic location based consumption information from location consumption database 1077. Module 1023 may rank the items it selects for recommendation. Each item may be given a rank value based on (a) the distance between the user's current location and the location where the item was consumed and/or (b) the type of consumption made with respect to the item. In some embodiments, a smaller distance scores higher than a larger distance and a consumption type of "Consumed" has a scores higher than a consumption type of "Consider."

Content based recommendation module 1024 may select one or more items to recommend to the user based on the content or type of app the user is currently using or just recently used. Information regarding app type's and content's may be stored in Meta-data database 1076.

Collaborative filtering recommendation module 1025 may select one or more items to recommend to the user based on the user's preferences. For example, collaborative filtering recommendation module 1025 may select one or more items to recommend to the user by (a) determining other user's who have similar preferences to the user and (b) selecting items that these other similar user's have rated highly (implicitly or explicitly).

The items selected by recommendation modules 1022-1025 may be filtered by recommendation filter 1091. For example, app recommendations being output for the user by recommendation engine 108 may consists of several different apps of the same category (e.g., providing the user with recommendation of 5 chess games). This may be disadvantageous because this may limit the ability to give recommendations for other types of apps since there may be a limit on how many apps may be recommended to a user at a specific time. Recommendation filter 1091 function to filter the recommendations output by recommendation engine 108 so as to improve the usability of the recommendations. While recommendation filter 1091 is shown as being separate and distinct from engine 108, in some embodiments, filter 1091 is a component of engine 108.

As also shown in FIG. 10, device 302 may periodically (e.g., occasionally) transmit a "periodic update" message 1052. For example, the message may be sent every certain period of time (e.g., once a day, once a week, once a month). This message may include consumption data and sensor data. The consumption data may include information identifying apps the user consumed since the last update message 1052 was sent and the sensor values at the time the app was consumed. In some embodiments the consumption data includes: the user's userid, an application's application id, information identifying the context in which the consumption of the app took place, and the type of the app consumption. Data collection unit 102, in some embodiments, monitors the users actions and also the sensor data during the actions. So these values are associated with each consumption.

In some embodiments there is a predefined set of app consumption types. In some embodiments, the set of predefined app consumption types includes: (a) Consumed (e.g., the user ran the app in the foreground); (b) Save (e.g., the user installed the app); (c) Glimpse (e.g., the app was shown on screen in a list (of recommendations) to the user; (d) Consider: The user viewed the details of an app; (e) Mark (e.g., the user placed the app in a bookmark list); (f) Associate (e.g., the app was returned as a recommendation to the user but was not necessarily display on screen); (g) Query (e.g., the user requested apps similar to the app); and (h) Delete (e.g., the user uninstalled the app).

A consumption interpretation module 1001 processes the consumption data to determine the consumption type. Each consumption type may be associated with a certain numerical action value that can be used in the process of recommendation. Action value unit 1003 converts the consumption types to action values, creates a user profile and stores the user profile in the user profile database 1005 (or the appropriate user profile is updated instead). For example, the consumption data (and/or data derived therefrom) is stored in user database 1005 and associated with the user.

In some embodiments in which update message 1052 includes location information identifying locations where apps were consumed, a location module 1012 receives update message 1052 and, for each item identified in update message, obtains therefrom the location data that identifies where the item was consumed, and stores in database 1077 consumption histories based on location. As described above location based recommendation module 1023 may obtain location based consumption information from location consumption database 1077 to select items to recommend to a user based on the user's current location.

Pattern analysis module 1004 and rule recognizer module 1006 are now described. Initially, the number of situations defined in the system may be limited to those that are thought to effect the consumption behavior of the users. The initial set of situations may be defined by a human expert. Therefore, not all possible situations may not be defined in the system. In some cases a situation defined in the system may be quite broad so as to encompass two or more different situations. Pattern analysis module 1004 performs analysis of the inferred context values to find frequent patterns of context values that occurs together in a context-situation database 1008. The learning provided in the system is preferably a supervised learning method. The decision of updating a situation rule may be taken by an expert. The expert names a situation by analyzing the context values of the frequent pattern. Naming a situation is important because it will help in explaining to the user why the recommendation was provided. On the other hand the expert will also have access to update the situation rules himself if he deems proper.

Content based recommendations are important because collaborative filtering approaches suffer from cold start problem (problem with new user or new item). The content based recommendation approaches are therefore used usually in combination with collaborative filtering to overcome this disadvantage. However, in the case of mobile apps it has been shown that the amount of metadata that is available for the mobile apps are not sufficient enough for content based recommendations. Hence an approach to generate more metadata for apps using information available on the internet and various other sources such as four square, GIS (Geographic Information System) services and maps is provided.

The concept is that when a user uses an app at say a restaurant the app may or may not be related with restaurants. However, when you have a large number of users who are using the specific app in the restaurant it may be useful to recommend the app to a user who is currently located in a restaurant. Also when you are facing cold start and the system doesn't have any nearby location consumption the system may generate recommendations just based on the metadata of apps.

Assume an app which is consumed in a certain location. From the maps and GIS Services, the system fetches certain tags for the apps. Now another user consumes this app from some other location and system fetches a different set of tags. However, there may be some tags which are common in both the sets. If the scores of these tags are added in the case they are common then eventually in a period of time the related tag will outscore the unrelated tags in the system and high scoring tags can be viewed as metadata of the app. A score here can be for example the based on the proximity of the tag to the current location.

Figure 11:
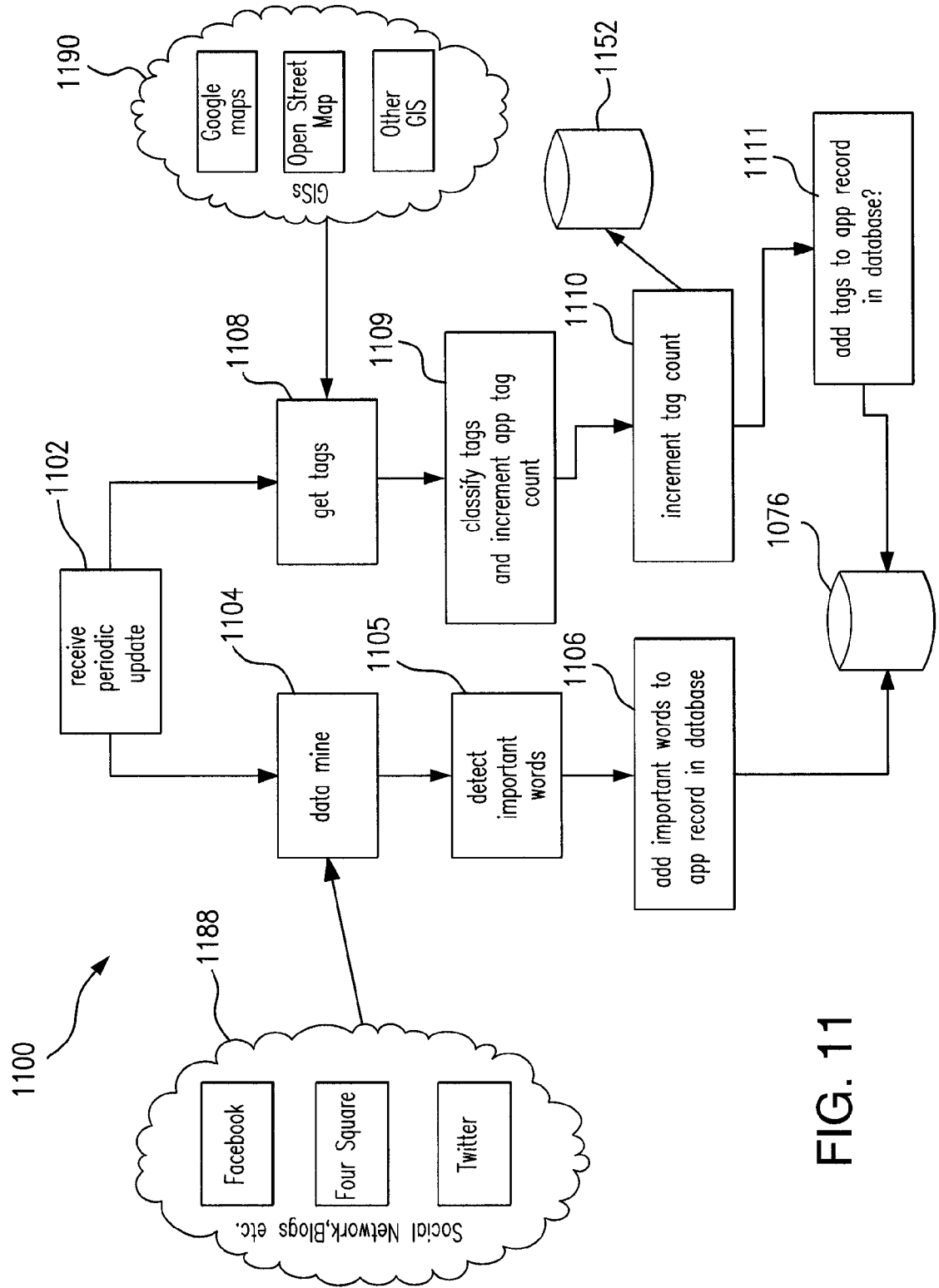
FIG. 11 illustrates a system and process for enriching metadata.

Referring now to FIG. 11, FIG. 11 is a flow chart illustrating a process 1100 for generating meta data for mobile apps according to some embodiments. Process 1100 may be performed by metadata module 1063. Process 1100 may begin in 1102, where metadata module 1063 receives an update message 1052. The update message may include an app identifier that identifies a particular app and, for each app identifier included in message 1052, the message may also contain location data identifying a location where the app was consumed, app data pertaining to the app (e.g. the apps name, the app developer), and other information. After step 1102, metadata module 1063 may performs steps 1104-1106 in parallel with steps 1108-1111 for each app identified by an app identifier included in message 1052.

In step 1104, data is mined from services that may contain data about the app. For example, the developer of an app may create for the app a facebook page, a web page, a twitter account, etc. Thus, in step 1104, data pertaining to the app may be obtained from one or more of these sources. As one specific example, comments posted by users on these pages may be mined. The comments provided by the users in the page are a possible source of information for metadata tags. Such comments are mined using text mining algorithms. As another example, if the user shares his facebook account with the system, the public data available in the public data page of the user can be used as association text for the application that he consumes (e.g., a user may share in the public profile of his profession and after collaborating the data from many users a relation can be discovered of the app with certain profession). As another example, people have general tendency to share apps on their twitter account. The various providers of the apps, including the Android™ app Market by Google Inc., provide the users with options for sharing the apps. People just don't share the apps but also write some text to describe the app. The twitter streams can be mined to analyze that text and come up with text that the users shared.

After step 1104, where text regarding the app is obtained from third-party services 1188, the text is examined to remove unimportant words and to produce a set of important words associated with the app (step 1105). Not all words will be important and useful. Words like 'the', 'this' etc. (stop words) will be abundant. These stop words should be eliminated. Some approach of Term frequency/Inversed document frequency (TF/IDF), Frequent words can be used to compute and come up with a list of important words. The set of important words is then added to a record associated with the app in database 1076 (step 1106). Thus, the set of important words becomes metadata for the app. In this way, metadata for an app can be generated.

In step 1108, the location data included in message 1052 may be used to obtain from one or more GIS 1190 (e.g., Google Maps™, Open Street Map (OSM), and other GISs) data (e.g., tags) associated with the location identified by the location data. GISs are a source of tags. In step 1108, for the location in consideration, tags on the map in certain radius of the location are fetched from the services with a distance measure of each tags from the location. The less the distance more is the weightage for the tag.

In step 1109, the obtained tags are classified. Different sources of information provide tags in different forms. For example, a "burger place" marked in OSM may be marked as "burger joint" in Google Maps™. Also you can broadly classify both as restaurant. Thus, a "burger joint" tag may be transformed into a "restaurant" tag or to a "fast food restaurant" tag or to a "burger restaurant" tag. Likewise, a "burger place" tag may be transformed into a "restaurant" tag or to a "fast food restaurant" tag or to a "burger restaurant" tag.

In step 1110, after the tags are classified, for each classified tag, the system increments a tag counter associated with the app and the classified tag. A database 1152 may be used to store a tag count for each app-tag pair. Thus, in step 1100, the tag counts stored in database 1152 may be incremented. For example, database 1152 may associate an app (e.g., the game Angry Birds) with a set of tags and each app/tag pair may be associated in the database with a tag count value representing the number of time the app has been associated with the tag. For instance, if Angry Birds is frequently consumed in an Airport waiting lounge, then database may associate the app with the tag "Airport Waiting Area" and may associate the app/tag pair (i.e., Angry Birds, Airport Waiting Area) with a count value that represents the number of times in a given period of time Angry Birds was consumed in a location associated with a tag that was classified as "Airport Waiting Area."

In step 1111, for each classified tag, a decision is made as to whether to add the tag to a metadata record in the database 1072 associated with the app such that the classified tag is associated with the app (i.e., becomes meta-data for the app). In some embodiments, the decision is based on the tag count value associated with the app-tag pair. The decision may further be based on a weight value associated with the app-tag pair. In some embodiments, if the tag count and/or weight value exceed a threshold, then the classified tag is added to database 1076 such that the classified tag is associated with the app. In this manner, meta-data for an app can be generated.

Figure 12:
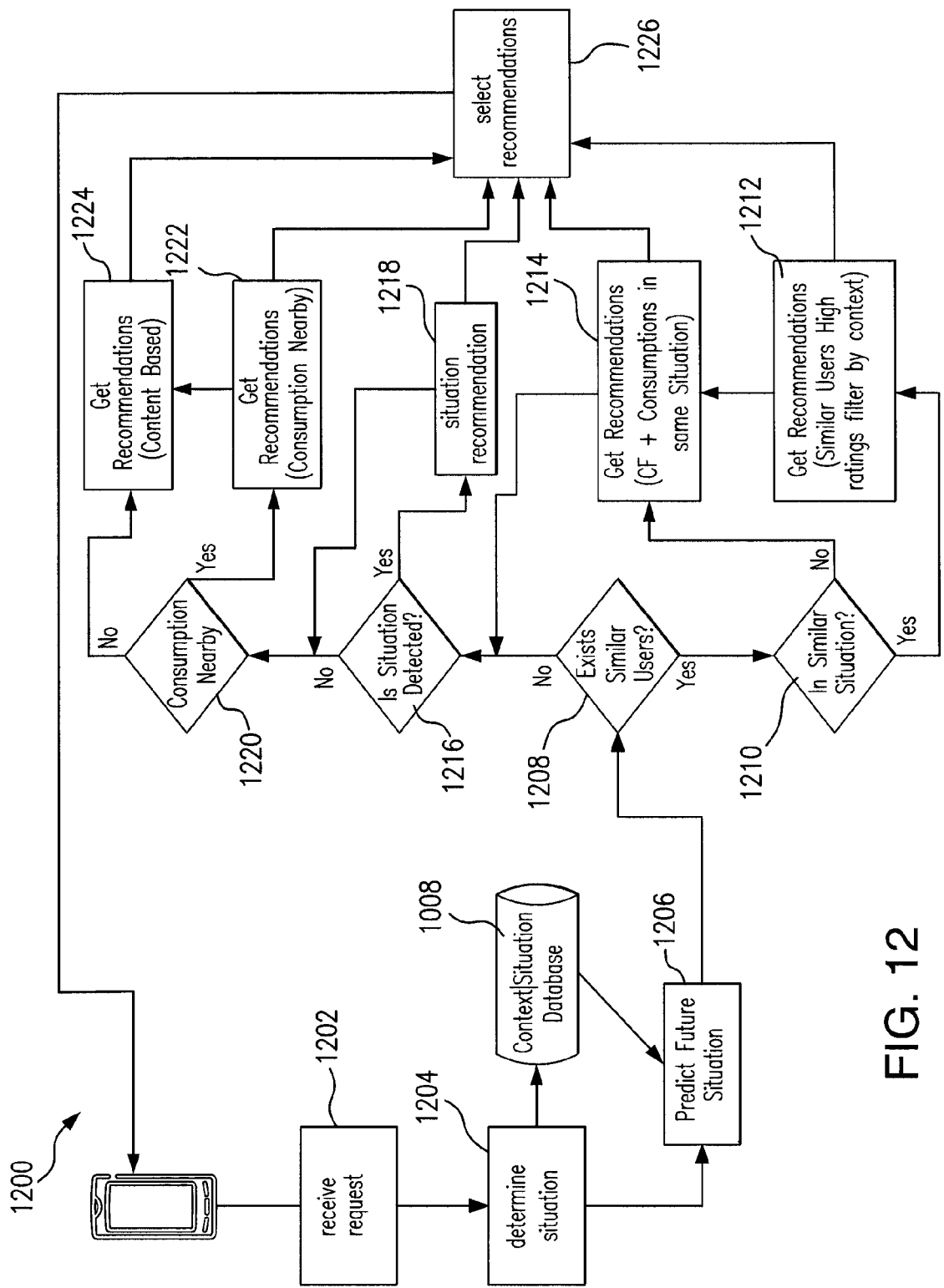
FIG. 12 illustrates a recommendation decision process.

Referring now to FIG. 12, FIG. 12 illustrates a recommendation decision process 1200. Process 1200 may begin in step 1202, where request for a recommendation 1051 is received. In step 1204, the user's current situation is determined. As shown in FIG. 12, the user's current situation may be recorded to database 1008. In step 1206, a future situation for the user is predicted based on the user's current situation and situations associated via database 1008 with the user's current situation. For example, once the situations of the users are stored in database 1008 it may be possible to use a situation prediction module to predict a future situation using prediction algorithms. Pattern analysis can be performed on the situations to find the next likely situation. In some embodiments, one can use the entire history of the user to predict the next situation. By predicting the user's future situation, the system may provide recommendation based on not just the user's current situation, but also a predicted situation for the user.

In step 1208, a determination is made as to whether there exists user's who are similar to the current user. For example, in step 1208 a determination is made as to whether there are enough users who are similar to the given user based on consumption behavior. If yes, the process proceeds to step 1210, otherwise it proceeds to step 1216.

In step 1210 a determination is made as to whether the any of the similar users consumed an app while in a situation similar to the user's current situation. For example, in step 1210 a determination is made as to whether there is enough consumption data in similar situation by the users who are computed as similar to the given user by the preceding step. The decisions in steps 1210 and 1208 may be governed by threshold values, which takes care of the requirement that there should be enough recommendations generated by the system. If yes, the process proceeds to step 1212, otherwise it proceeds to step 1214.

In step 1212, the system determines a set of apps that were consumed by similar users in a situation similar to the given user's current situation and then selects for recommendation one or more of these apps. When the situation of the given user is known, a simple filter by that situation of the consumption data of similar users may achieve this task. After step 1212, the process may proceed to step 1214.

In step 1214, the system determines: (1) a first set of apps that were consumed by similar users and/or (2) a second set of apps that were consumed by dissimilar users in a situation similar to the given user's current situation, and then selects for recommendation (a) one or more of these apps from the first set and/or (b) one or more apps from the second set. After step 1214, the process may proceed to step 1216.

In step 1216, a determination is made as to whether the user's current situation is known or unknown. The system may not define a particular situation in its situation rules and as such detecting situations all the time may not be possible. If the user's current situation is known, then the process proceeds to step 1218, otherwise it proceeds to step 1220.

In step 1218, the system determines: (1) a first set of apps that were consumed by users in a situation similar to the given user's current situation and/or (2) a second set of apps associated with tags associated with the user's current context and/or situation, and then selects for recommendation (a) one or more of these apps from the first set and/or (b) one or more apps from the second set. After step 1218, the process may proceed to step 1220.

In step 1220, a determination is made whether there exist apps that have been consumed at a location that is within a certain distance (e.g., 50 meters) of the user's current location. If there exist such apps, the process proceeds to step 1222, otherwise the process proceeds to step 1224.

In step 1222, the system determines a set of apps that have been consumed at a location that is within a certain distance (e.g., 50 meters) of the user's current location and then selects for recommendation one or more apps from this set. After step 1222, the process may proceed to step 1224.

In step 1224, the system selects for recommendation one or more apps based on the content of the apps being generated in the enrich metadata process. For example, if the user's location is known, then tags associated with that location can be obtained (as described above). Once the tags associated with the user's location are obtained, the system can search database 1076 for apps that are associated with one or more of the tags and recommend one or more of those apps. After step 1224, the process may proceed to step 1226.

In step 1226, the system selects for recommendation one more items that were selected for recommendation in one of the prior selection steps (i.e., steps 1212, 1214, 1218, 1222, and 1224). The purpose is to merge the recommendations of different units according to weights given to each recommended item. The weights may be determined by the decision outcomes if the outcome is not absolute. On the other hand predefined weights can also be used by the system. The unit generates a recommendation list based on the output of the components.

Figure 13:
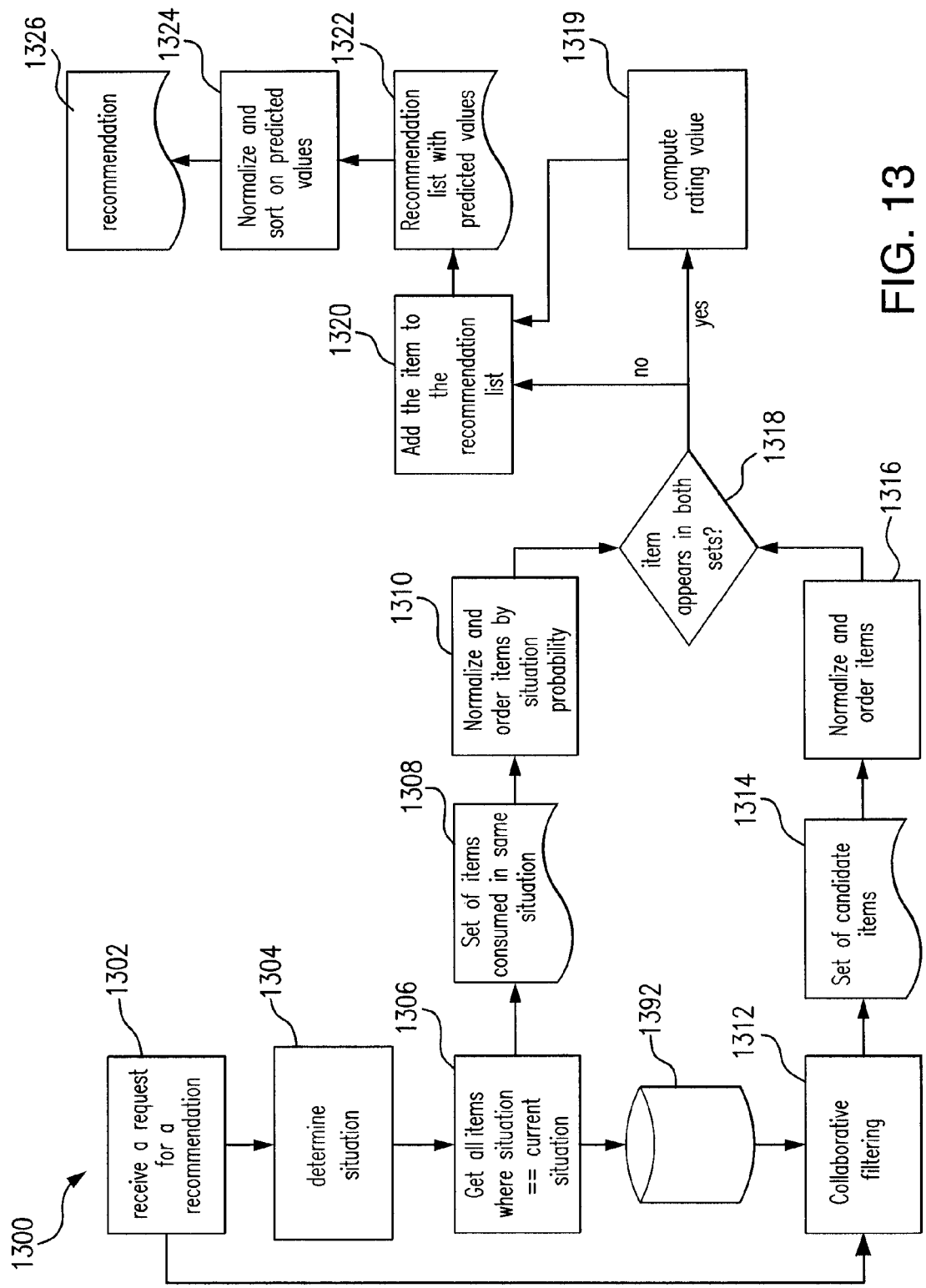
FIG. 13 is a flow chart illustrating a process, according to some embodiments, for selecting a set of items for recommendation to a user.

FIG. 13 is a flow chart illustrating a process 1300, according to some embodiments, for selecting a set of items for recommendation to a user. Process 1300 may begin in step 1302, where a recommendation request 1051 is received. After step 1302, process 1300 may proceed in parallel to steps 1304 and 1312. In step 1304, the user's current situation is determined.

In step 1306, recommendation engine 108 obtains from a database 1392 a first set of item records 1308, where each item record includes a situation identifier that identifier the situation determined in step 1304.

FIG. 14, illustrates a table 1402 from database 1392. Table 1402 includes a set of item records 1404. As shown in FIG. 14, the item records includes a number of fields including: a user identifier field for storing an item identifier that identifies a user; an item identifier field for storing an item identifier that identifies a item; a rating field for storing a value representing the user's rating (explicit or implicit) of the item (e.g., a value representing an app consumption type); a situation identifier field for storing a situation identifier that identifies a situation; and a situation probability field for storing a value representing a confidence that the identified situation is the correct situation. Item records may be added to table 1402 each time an update message 1052 is received by system 300 (e.g., server 304). For example, when an update message 1052 is received, the update message may include an item identifier, a user identifier, a rating value as well as information (e.g., sensor data) that can be used to determine a situation identifier and a situation probability value. Thus, in some embodiments, in response to receiving an update message, a record can be and is added to table 1402.

In step 1310, the first set of items may be normalized and ordered. For example, if the first set includes n item records that have the same item identifier, then the set of n item records may be replaced with a single item record where the rating value is the average of the rating values of the n records. The records may be ordered by the situation probability value.

In step 1312, system 300 produces a second set of items 1314. For example, a collaborative filtering algorithm known in the art may be used to produce the second set of items 1314. In step 1316, the second set of items may be normalized and ordered. After steps 1310 and 1316 are performed, the process may proceed to steps 1318-1320, which steps may be performed for each item in the first and/or second set.

In step 318, a determination is made of the item appears in both sets. If not, the process proceeds to step 1320, otherwise it proceeds to step 1319. In step 1319, the system computes a rating value for the item based on the rating value associated with the item record in the first set and the rating value associated with the item record in the second set. After step 1319, step 1320 is performed.

In step 1320, the item identifier together with a rating value associated with the item identifier (e.g., rating value computed in step 1319 or the rating value from the item record) is added to a list or candidate recommended items 1322

In step 1324, the items in list 1322 are sorted based on the items' rating values and items may be removed from the list if the rating value for the item falls below a threshold, thereby creating a list of items 1326 that may be recommended to the user.

Figure 15:
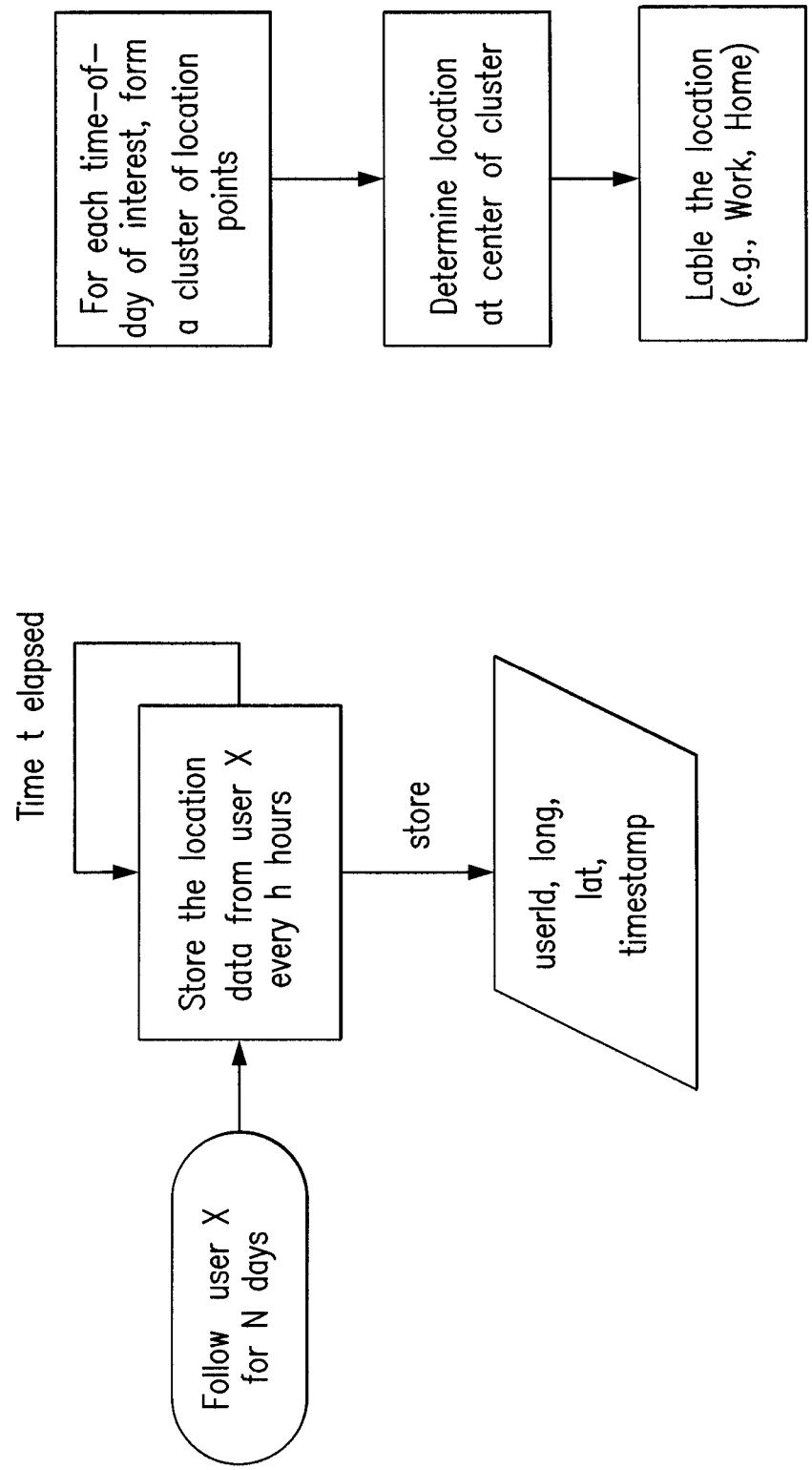
FIG. 15 is a flow chart illustrating a process, according to some embodiments, for determining a user's work location and home location.

FIG. 15 illustrates a process, according to some embodiments, for determining a user's work location and home location.

Figure 7:
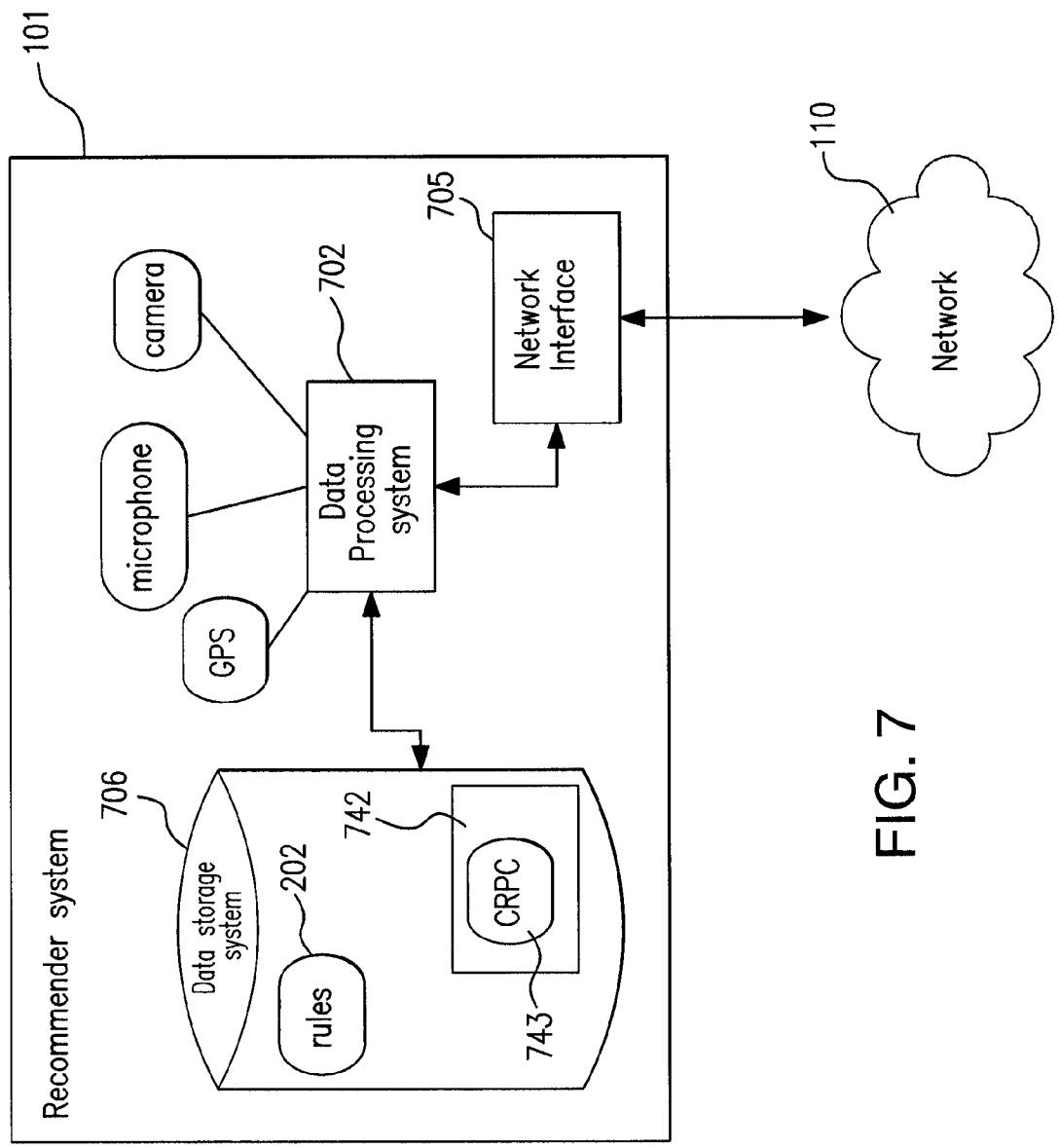
FIG. 7 is a block diagram of a particular embodiment of a recommender system or components thereof.

FIG. 7 illustrates a possible implementation for at least some components of recommender system 101 according to some embodiments of recommender system 101. As shown in FIG. 7, recommender system 101 may include: a data processing system 702, which may include one or more microprocessors and/or one or more circuits, such as an application specific integrated circuit (ASIC), Field-programmable gate arrays (FPGAs), etc; a network interface 705 for receiving messages (e.g., messages transmitted from communication device 302); data storage system 706, which may include one or more non-volatile storage devices and/or one or more volatile storage devices (e.g., random access memory (RAM)). As shown, data storage system 706 may be used to store rules database 202. In embodiments where data processing system 702 includes a microprocessor, a computer program product is provided, which computer program product includes: computer readable program code 743, which implements a computer program, stored on a computer readable medium 742, such as, but not limited, to magnetic media (e.g., a hard disk), optical media (e.g., a DVD), memory devices (e.g., random access memory), etc. In some embodiments, computer readable program code 743 is configured such that when executed by a processor, code 743 causes the processor to perform steps described above (e.g., steps describe above with reference to the flow charts shown in FIGS. 4-6).

Figure 8:
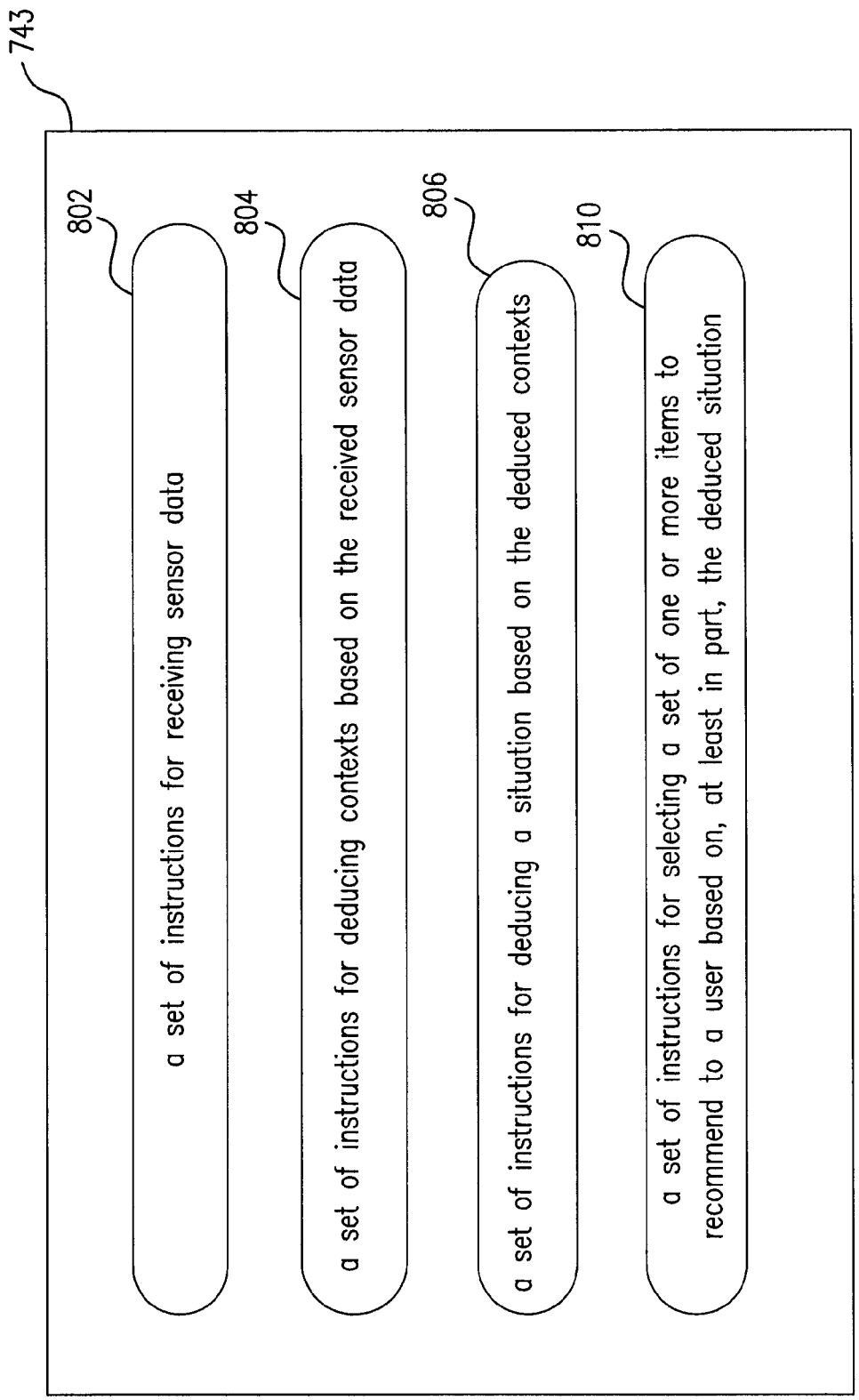
FIG. 8 is a block diagram illustrating example software components of a recommender system according to some embodiments.

FIG. 8 illustrates an embodiment of computer readable program code (CRPC) 743. In the embodiment shown, CRPC 743 includes: (1) a set of instructions 802 for receiving sensor data, (2) a set of instructions 804 for deducing contexts based on the received sensor data, (3) a set of instructions 806 for deducing a situation based on the deduced contexts, and (4) a set of instructions 810 for selecting a set of one or more items to recommend to a user based on, at least in part, the deduced situation.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, in a recommendation system comprising a computer, for providing to a first user a recommendation, the method being performed by the computer and comprising:
  obtaining first sensor data from a first sensor of a communication device the first user is presently using or, at the least, has in his/her possession;
  obtaining second sensor data from a second sensor of the communication device;
  using the first sensor data and a first pre-defined set of contexts, selecting a first context from the first pre-defined set of contexts;
  using the second sensor data and a second pre-defined set of contexts, selecting a second context from the second pre-defined set of contexts;
  deducing a situation using the selected contexts; and
  selecting a set of one or more items to recommend to the first user based on, at least in part, the deduced situation.

2. The method of claim 1, wherein the step of selecting a set of one or more items comprises:
  determining at least one user that is similar to said first user;
  determining a set of one or more apps that were consumed by said similar user in a situation similar to the deduced situation; and
  selecting one or more apps from said set of one or more apps to recommend to the first user.

3. The method of claim 1, wherein the step of selecting a set of one or more items comprises:
  in response to determining that at least a threshold number of other users consumed a particular application (app) in a situation similar to the deduced situation, selecting the particular app to recommend to the first user.

4. The method of claim 1, further comprising:
  determining at least one user that is similar to said first user;
  determining a set of one or more apps that were consumed by said similar user; and
  selecting one or more apps from said set of one or more apps to recommend to the first user.

5. The method of claim 1, wherein
  the first sensor data includes location information identifying the first user's location, and
  the method further comprises: determining a set of one or more apps that were consumed by at least one other user at a location within a predefined distance of the user's location; and selecting one or more apps from said determined set of one or more apps to recommend to the first user.

6. The method of claim 1, wherein
  the first sensor data includes location information identifying the first user's location, and
  the method further comprises: using the location information to obtain from a geographic information service tags associated with the first user's location; determining an app associated with one or more of the tags; and selecting the determined app to recommend to the first user.

7. The method of claim 1, wherein the first sensor data includes location information identifying the first user's location, the step of selecting the first context comprises: determining whether the first user is located within his/her home or at his/her workplace and selecting a "home" context in response to a determination that the first user is located within the home or selecting a "work" context in response to a determination that the first user is located at the workplace, and the first pre-defined set of contexts is the same as the second pre-defined set of contexts.

8. An apparatus for use in a recommendation system for providing to a first user a recommendation, the apparatus comprising:

one or more non-transitory computer readable mediums storing a data collection unit, a context interface unit, a situational reasoning unit, and a recommendation engine;

the data collection unit adapted to obtain first sensor data from a first sensor and second sensor data from a second sensor;

the context inference unit adapted to: (a) use the first sensor data and a first pre-defined set of contexts to select a first context from the first pre-defined set of contexts and (b) use the second sensor data and a second pre-defined set of contexts to select a second context from the second pre-defined set of contexts;

the situational reasoning unit adapted to deduce a situation using the selected contexts; and the recommendation engine adapted to select a set of one or more items to recommend to the first user based on, at least in part, the deduced situation.

9. The apparatus of claim 8, wherein the recommendation engine is adapted to select the set of one or more items by:

determining at least one user that is similar to said first user;

determining a set of one or more apps that were consumed by said similar user in a situation similar to the deduced situation; and selecting one or more apps from said set of one or more apps to recommend to the first user.

10. The apparatus of claim 8, wherein the recommendation engine is adapted to select the set of one or more items by selecting a particular application (app) to recommend to the first user in response to determining that at least a threshold number of other users consumed the particular app in a situation similar to the deduced situation.

11. The apparatus of claim 8, wherein the recommendation engine is further adapted to:

determine at least one user that is similar to said first user;

determine a set of one or more apps that were consumed by said similar user; and select one or more apps from said set of one or more apps to recommend to the first user.

12. The apparatus of claim 8, wherein the first sensor data includes location information identifying the first user's location, and the recommendation engine is further adapted to: determine a set of one or more apps that were consumed by at least one other user at a location within a predefined distance of the user's location; and select one or more apps from said determined set of one or more apps to recommend to the first user.

13. The apparatus of claim 8, wherein the first sensor data includes location information identifying the first user's location, and the recommendation engine is further adapted to: use the location information to obtain from a geographic information service tags associated with the first user's location, determine an app associated with one or more of the tags, and select the determined app to recommend to the first user.

14. The apparatus of claim 8, wherein the first sensor data includes location information identifying the first user's location, and the context inference unit is adapted to determine whether the first user is located within his/her home or at his/her workplace and selecting a "home" context in response to a determination that the first user is located within the home or selecting a "work" context in response to a determination that the first user is located at the workplace.

15. A computer program product comprising computer readable program code, which implements a computer program, stored on a computer readable medium, the computer readable program code being configured such that when executed by a processor, the computer readable program code causes the processor to perform a method comprising:

obtaining first sensor data from a first sensor of a communication device the first user is presently using or, at the least, has in his/her possession;

obtaining second sensor data from a second sensor of the communication device;

using the first sensor data and a first pre-defined set of contexts, selecting a first context from the first pre-defined set of contexts;

using the second sensor data and a second pre-defined set of contexts, selecting a second context from the second pre-defined set of contexts;

deducing a situation using the selected contexts; and selecting a set of one or more items to recommend to the first user based on, at least in part, the deduced situation.

16. The computer program product of claim 15, wherein the step of selecting a set of one or more items comprises:

determining at least one user that is similar to said first user;

determining a set of one or more apps that were consumed by said similar user in a situation similar to the deduced situation; and selecting one or more apps from said set of one or more apps to recommend to the first user.

17. The computer program product of claim 15, wherein the step of selecting a set of one or more items comprises:

in response to determining that at least a threshold number of other users consumed a particular application (app) in a situation similar to the deduced situation, selecting the particular app to recommend to the first user.

18. The computer program product of claim 15, wherein the method further comprises:

determining at least one user that is similar to said first user;

determining a set of one or more apps that were consumed by said similar user; and selecting one or more apps from said set of one or more apps to recommend to the first user.

19. The computer program product of claim 15, wherein the first sensor data includes location information identifying the first user's location, and the method further comprises one or more of (a) and (b):

(a) determining a set of one or more apps that were consumed by at least one other user at a location within a predefined distance of the user's location; and selecting one or more apps from said determined set of one or more apps to recommend to the first user, and (b) using the location information to obtain from a geographic information service tags associated with the first user's location; determining an app associated with one or more of the tags; and selecting the determined app to recommend to the first user.

20. The computer program product of claim 15, wherein
the first sensor data includes location information identifying the first user's location, and
the step of selecting the first context comprises: determining whether the first user is located within his/her home or at his/her workplace and selecting a "home" context in response to a determination that the first user is located within the home or selecting a "work" context in response to a determination that the first user is located at the workplace.

21. The method of claim 1, wherein the first sensor is a microphone and the first sensor data is data produced by the microphone that indicates a noise level.

22. The method of claim 1, wherein the first sensor data consists of location information and the first pre-defined set of contexts consists of not more than four contexts.

23. The method of claim 1, wherein
the first sensor is a camera and the first sensor data is data produced by the camera that provides information as to whether the user is indoors or outdoors, and
selecting a first context from the first pre-defined set of contexts comprises using the data produced by the camera to determine that the user is indoors.

24. The method of claim 1, wherein
the first sensor is a clock and the first sensor data identifies a time;
the second sensor is a location sensor and the second sensor data identifies a location;
the first context is a location context selected from a set of contexts comprising: a home context and a work context;
the second context is a time context; and
deducing the situation using the selected contexts consists of deducing the situation using only said time context and said location context.

* * * * *